United States Patent
Iwabuchi

(10) Patent No.: US 11,015,049 B2
(45) Date of Patent: *May 25, 2021

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventor: Satoshi Iwabuchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/088,747

(22) PCT Filed: Mar. 24, 2017

(86) PCT No.: PCT/JP2017/012001
§ 371 (c)(1),
(2) Date: Sep. 26, 2018

(87) PCT Pub. No.: WO2017/170221
PCT Pub. Date: Oct. 5, 2017

(65) Prior Publication Data
US 2019/0127566 A1 May 2, 2019

(30) Foreign Application Priority Data
Mar. 28, 2016 (JP) .............................. JP2016-064436
Mar. 29, 2016 (JP) .............................. JP2016-066141

(51) Int. Cl.
| C08L 27/06 | (2006.01) |
| B32B 27/40 | (2006.01) |
| C08K 5/00 | (2006.01) |
| C08K 5/12 | (2006.01) |
| C08K 5/1515 | (2006.01) |
| C08L 83/06 | (2006.01) |
| C08K 5/10 | (2006.01) |
| C08K 5/521 | (2006.01) |
| C08L 83/04 | (2006.01) |
| B29C 41/20 | (2006.01) |
| B32B 27/30 | (2006.01) |
| B29C 41/18 | (2006.01) |
| B32B 5/18 | (2006.01) |
| B32B 27/06 | (2006.01) |
| B32B 27/08 | (2006.01) |
| B29K 27/06 | (2006.01) |
| B29K 75/00 | (2006.01) |
| B29L 31/30 | (2006.01) |

(52) U.S. Cl.
CPC .............. *C08L 27/06* (2013.01); *B29C 41/18* (2013.01); *B29C 41/20* (2013.01); *B32B 5/18* (2013.01); *B32B 27/065* (2013.01); *B32B 27/08* (2013.01); *B32B 27/30* (2013.01); *B32B 27/304* (2013.01); *B32B 27/40* (2013.01); *C08K 5/0016* (2013.01); *C08K 5/10* (2013.01); *C08K 5/12* (2013.01); *C08K 5/1515* (2013.01); *C08K 5/521* (2013.01); *C08L 83/04* (2013.01); *C08L 83/06* (2013.01); *B29K 2027/06* (2013.01); *B29K 2075/00* (2013.01); *B29L 2031/3008* (2013.01); *B32B 2266/0278* (2013.01); *B32B 2327/06* (2013.01); *B32B 2605/003* (2013.01); *C08L 2205/025* (2013.01); *C08L 2205/03* (2013.01); *C08L 2205/06* (2013.01)

(58) Field of Classification Search
CPC ......... B32B 27/30; B32B 27/065; B32B 5/18; B32B 27/40
See application file for complete search history.

(56) References Cited

U.S. PATENT DOCUMENTS

| 4,675,356 A | 6/1987 | Miyata | |
| 2010/0272984 A1 | 10/2010 | Hada et al. | |
| 2015/0337204 A1* | 11/2015 | Yamazaki | ............... C08K 5/053 524/100 |
| 2017/0233567 A1* | 8/2017 | Nishimura | ............... C08L 27/06 428/424.6 |
| 2018/0066120 A1 | 3/2018 | Nishimura | |
| 2019/0270874 A1* | 9/2019 | Nishimura | ............... B32B 27/30 |

FOREIGN PATENT DOCUMENTS

| CN | 107429025 A | 12/2017 |
| EP | 3266826 A1 | 1/2018 |
| FR | 2730739 A1 | 8/1996 |
| JP | S5188543 A | 8/1976 |
| JP | S59112450 | 6/1984 |
| JP | S61174270 A | 8/1986 |
| JP | H05148397 A | 6/1993 |
| JP | 08291243 A * | 11/1996 |

(Continued)

OTHER PUBLICATIONS

Translation of JP 11-302485, Osayasu Noda, Nov. 2, 1999. (Year: 1999).*
Translation of JP 08-291243, Masuda et al., Nov. 5, 1996. (Year: 1996).*
Oct. 2, 2018, International Preliminary Report on Patentability issued in the International Patent Application No. PCT/JP2017/011998.
Oct. 2, 2018, International Preliminary Report on Patentability issued in the International Patent Application No. PCT/JP2017/012001.
Jun. 20, 2017, International Search Report issued in the International Patent Application No. PCT/JP2017/012001.

(Continued)

Primary Examiner — Hai Vo
(74) Attorney, Agent, or Firm — Kenja IP Law PC

(57) ABSTRACT

A vinyl chloride resin composition with which the surface stickiness of a vinyl chloride resin molded product can be suppressed is provided. A vinyl chloride resin composition comprises: (a) a vinyl chloride resin; (b) a plasticizer; and (c) a modified silicone oil, wherein (c) the modified silicone oil is a modified silicone oil that is at least one of: hydrogen-modified; phenyl-modified; alkyl/aralkyl-modified; and fatty acid amide-modified.

7 Claims, No Drawings

(56) References Cited

FOREIGN PATENT DOCUMENTS

| JP | H08291243 | A | | 11/1996 |
|----|-----------|---|---|---------|
| JP | H08291244 | A | | 11/1996 |
| JP | H108308 | A | | 1/1998 |
| JP | 11302485 | A | * | 11/1999 |
| JP | H11302485 | A | | 11/1999 |
| JP | 2000204212 | A | | 7/2000 |
| JP | 2011173974 | A | | 9/2011 |
| JP | 2012007026 | A | | 1/2012 |

OTHER PUBLICATIONS

Polyvinyl Chloride, edited by The Division of Polymer Sciences, The Kinki Chemical Society, Japan, 1988, p. 75 I. 10-p. 104, Nikkan Kogyo Shimbun Ltd.

Oct. 21, 2019, the Extended European Search Report issued by the European Patent Office in the corresponding European Patent Application No. 17774757.3.
Oct. 21, 2019, the Extended European Search Report issued by the European Patent Office in the corresponding European Patent Application No. 17774758.1.
Apr. 28, 2020, Office Action issued by the United States Patent and Trademark Office in the U.S. Appl. No. 16/087,244.
Silaplane, Silaplane Reactive Silicones, retrieved on Apr. 23, 2020, from URL: https://www.jnc-corp.co.jp/silicon_products/english/silaplane/mono.html.
Oct. 5, 2020, Office Action issued by the United States Patent and Trademark Office in the U.S. Appl. No. 16/087,244.
Shin-Etsu, Reactive & Non-Reactive Modified Silicone Fluid, 2009, pp. 1-10.
Aug. 24, 2020, Communication pursuant to Article 94(3) EPC issued by the European Patent Office in the corresponding European Patent Application No. 17774757.3.
Mar. 15, 2021, Office Action issued by the United States Patent and Trademark Office in the U.S. Appl. No. 16/087,244.

* cited by examiner

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins typically have excellent characteristics such as cold resistance, heat resistance, and oil resistance, and therefore are used for various applications. Specifically, vinyl chloride resins are used, for example, in the formation of surface skins of automobile instrument panels. An automobile instrument panel has a layered structure in which a foamed polyurethane layer is disposed between a substrate and a surface skin formed from a molded product of a vinyl chloride resin. The vinyl chloride resin molded product forming the surface skin of the automobile instrument panel is required to have various performance.

In recent years, for example, there have been attempts to improve vinyl chloride resin compositions and vinyl chloride resin molded products suitable for use in the production of automobile instrument panels. For example, vinyl chloride resin compositions in recent years contain a relatively large amount of plasticizer to control the flexibility of a vinyl chloride resin molded product. This is because a vinyl chloride resin molded product obtained through powder molding of a vinyl chloride resin tends to decrease in flexibility due to exposure to relatively high temperature during the molding.

JP H8-291243 A (PTL 1) discloses a vinyl chloride resin composition for powder molding containing 100 parts by weight of a vinyl chloride resin, 0.3 parts to 3 parts by weight of a fatty acid amide, 0.1 parts to 3 parts by weight of an organopolysiloxane, and 20 parts to 200 parts by weight of a plasticizer. According to PTL 1, the inclusion of the fatty acid amide and the organopolysiloxane together reduces the coefficient of friction of a powder molded product and enables the obtainment of a vinyl chloride resin composition having high adhesiveness to foamed polyurethane.

CITATION LIST

Patent Literature

PTL 1: JP H8-291243 A

SUMMARY

Technical Problem

As mentioned above, the plasticizer content in vinyl chloride resin compositions has become relatively high in recent years. An increase in plasticizer content, however, makes the surface of the vinyl chloride resin molded product stickier. Since an automobile instrument panel is a part touched by a driver or a passenger, excessive stickiness leads to a poor sense of touch. While it is difficult to accurately evaluate the surface stickiness using only one index, the surface stickiness can be quantitatively evaluated with a certain level of accuracy by using the coefficient of dynamic friction of the vinyl chloride resin molded product.

The friction focused with regard to the powder molded product described in PTL 1 involves rubbing sound and squeaking sound of the vinyl chloride resin composition with other vehicle interior materials during vehicle running. With the technique described in PTL 1, the surface stickiness of the vinyl chloride resin molded product cannot be suppressed sufficiently.

It could therefore be helpful to provide a vinyl chloride resin composition with which the surface stickiness of a resultant vinyl chloride resin molded product can be suppressed. It could also be helpful to provide a vinyl chloride resin molded product with surface stickiness suppressed, and a laminate including the vinyl chloride resin molded product.

Solution to Problem

Through extensive studies to solve the problems stated above, the inventor discovered that, by using a vinyl chloride resin composition in which a predetermined modified silicone oil is added to a vinyl chloride resin, the surface stickiness of a vinyl chloride resin molded product after molding can be suppressed noticeably. The present disclosure is based on these discoveries.

To advantageously solve the problems stated above, a presently disclosed vinyl chloride resin composition comprises: (a) a vinyl chloride resin; (b) a plasticizer; and (c) a modified silicone oil, wherein (c) the modified silicone oil is a modified silicone oil that is at least one of: hydrogen-modified; phenyl-modified; alkyl/aralkyl-modified; and fatty acid amide-modified. The use of the vinyl chloride resin composition containing such a modified silicone oil can suppress the surface stickiness of the vinyl chloride resin molded product.

Preferably, in the presently disclosed vinyl chloride resin composition, (c) the modified silicone oil is at least a side chain type modified silicone oil. The use of such a modified silicone oil can suppress the surface stickiness of the vinyl chloride resin molded product more reliably.

Preferably, in the presently disclosed vinyl chloride resin composition, a content of (c) the modified silicone oil relative to 100 parts by mass of (a) the vinyl chloride resin is 0.05 parts by mass or more and 5 parts by mass or less. As a result of the content of the modified silicone oil being in this range, the surface stickiness of the vinyl chloride resin molded product can be suppressed more reliably.

Preferably, the presently disclosed vinyl chloride resin composition is used in powder molding. The use of the vinyl chloride resin composition for powder molding enables, for example, the vinyl chloride resin composition to be more suited to the formation of a vinyl chloride resin molded product used in an automobile instrument panel and the like.

Preferably, the presently disclosed vinyl chloride resin composition is used in powder slush molding. The use of the vinyl chloride resin composition for powder slush molding enables, for example, the vinyl chloride resin composition to be further suited to the formation of a vinyl chloride resin molded product used in an automobile instrument panel and the like.

To advantageously solve the problems stated above, a presently disclosed vinyl chloride resin molded product is obtainable through molding of the vinyl chloride resin composition described above. By forming the vinyl chloride resin molded product using the vinyl chloride resin composition described above, the surface stickiness can be suppressed.

Preferably, the presently disclosed vinyl chloride resin molded product is used as a surface skin of an automobile instrument panel. The surface skin of the automobile instrument panel formed using the presently disclosed vinyl chloride resin molded product has surface stickiness suppressed, and thus provides a favorable sense of touch.

To advantageously solve the problems stated above, a presently disclosed laminate comprises: a foamed polyurethane molded product; and the vinyl chloride resin molded product described above. The laminate formed using the foamed polyurethane molded product and the vinyl chloride resin molded product can be favorably used in an automobile instrument panel.

Advantageous Effect

It is therefore possible to provide a vinyl chloride resin composition with which the surface stickiness of a vinyl chloride resin molded product can be suppressed. It could also be helpful to provide a vinyl chloride resin molded product with surface stickiness suppressed, and a laminate including the vinyl chloride resin molded product.

DETAILED DESCRIPTION

One of the disclosed embodiments is described in detail below.

A presently disclosed vinyl chloride resin composition can be used, for example, in the formation of a presently disclosed vinyl chloride resin molded product. The vinyl chloride resin molded product formed using the presently disclosed vinyl chloride resin composition can be used, for example, in the production of a presently disclosed laminate including the vinyl chloride resin molded product. The presently disclosed vinyl chloride resin molded product is suitable for use as an automobile interior material, e.g. a surface skin of an automobile instrument panel.

(Vinyl Chloride Resin Composition)

The presently disclosed vinyl chloride resin composition comprises: (a) a vinyl chloride resin; (b) a plasticizer; and (c) a modified silicone oil, wherein (c) the modified silicone oil is a modified silicone oil that is at least one of: hydrogen-modified; phenyl-modified; alkyl/aralkyl-modified; and fatty acid amide-modified. The presently disclosed vinyl chloride resin composition may optionally further contain additives and the like, in addition to these components. Since the presently disclosed vinyl chloride resin composition contains the above-mentioned predetermined components and contains the above-mentioned predetermined modified silicone oil, the surface stickiness of the resultant vinyl chloride resin molded product can be suppressed. Consequently, for example, a surface skin of an automobile instrument panel using the vinyl chloride resin molded product has surface stickiness suppressed, and thus provides a favorable sense of touch.

<(a) Vinyl Chloride Resin>

(a) The vinyl chloride resin used in the vinyl chloride resin composition may, for example, contain one or more types of vinyl chloride resin particles, and optionally further contain one or more types of vinyl chloride resin fine particles. In particular, (a) the vinyl chloride resin preferably contains at least vinyl chloride resin particles, more preferably contains vinyl chloride resin particles and vinyl chloride resin fine particles, and further preferably contains one type of vinyl chloride resin particles and two types of vinyl chloride resin fine particles.

Herein, the term "resin particles" is used to refer to particles having a particle diameter of at least 30 μm and the term "resin fine particles" is used to refer to particles having a particle diameter of less than 30 μm.

Conventionally known production methods such as suspension polymerization, emulsion polymerization, solution polymerization, and bulk polymerization can be used to produce (a) the vinyl chloride resin.

<<Composition>>

Examples of (a) the vinyl chloride resin include homopolymers composed of vinyl chloride monomer units, and vinyl chloride-based copolymers preferably containing 50 mass % or more of vinyl chloride monomer units and more preferably 70 mass % or more of vinyl chloride monomer units. Specific examples of monomers (comonomers) copolymerizable with vinyl chloride monomers that can form vinyl chloride copolymers include: olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl-3-chloro-2-oxy propyl ether and allyl glycidyl ether; unsaturated carboxylic acids, esters of unsaturated carboxylic acids, and acid anhydrides of unsaturated carboxylic acids such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropane sulfonic acid, and (meth)acrylamidopropyltrimethylammonium chloride; and allyl amines and derivatives thereof such as allylamine benzoate and diallyldimethylammonium chloride. The above examples of monomers are merely some of comonomers. Further examples of various types of monomers that can be used as comonomers are provided in pages 75-104 of "Polyvinyl chloride" edited by the Vinyl Section of the Kinki Chemical Society Japan and published by Nikkan Kogyo Shimbun, Ltd. (1988). Any one of these comonomers or any two or more of these comonomers may be used. Moreover, (a) the vinyl chloride resin may include a resin formed by graft polymerization of (1) vinyl chloride or (2) vinyl chloride and a comonomer such as described above, with a resin such as an ethylene-vinyl acetate copolymer, an ethylene-methyl methacrylate copolymer, an ethylene-ethyl acrylate copolymer, or a chlorinated polyethylene.

The present description uses the term "(meth)acryl" to refer to either or both of acryl and methacryl.

<<Vinyl Chloride Resin Particles>>

In the vinyl chloride resin composition, the vinyl chloride resin particles typically function as a matrix resin (substrate). The vinyl chloride resin particles are preferably produced by suspension polymerization.

[Average Degree of Polymerization]

The average degree of polymerization of the vinyl chloride resin particles is preferably 500 or more, more preferably 700 or more, and further preferably 900 or more, and preferably 5000 or less, more preferably 3000 or less, further preferably 2500 or less, and still more preferably 1500 or less. As a result of the average degree of polymerization of the vinyl chloride resin particles being not less than the above-mentioned lower limit, more favorable tensile elongation can be achieved while sufficiently ensuring the physical strength of a vinyl chloride resin molded product formed using the vinyl chloride resin composition. As a result of the average degree of polymerization of the vinyl chloride resin particles being not more than the above-mentioned upper limit, the meltability of the vinyl chloride resin molded product can be improved to improve surface smoothness.

Herein, the "average degree of polymerization" can be measured in accordance with JIS K6720-2.

[Average Particle Diameter]

The average particle diameter of the vinyl chloride resin particles is not limited, as long as it is 30 μm or more. The average particle diameter of the vinyl chloride resin particles is preferably 50 μm or more and more preferably 100 μm or more, and preferably 500 μm or less, more preferably 250 μm or less, and further preferably 200 μm or less. As a result of the average particle diameter of the vinyl chloride resin particles being not less than the above-mentioned lower limit, the powder fluidity of the vinyl chloride resin composition can be further improved. As a result of the average particle diameter of the vinyl chloride resin particles being not more than the above-mentioned upper limit, the meltability of the vinyl chloride resin composition can be further improved, and the smoothness of the vinyl chloride resin molded product formed using the composition can be further improved.

Herein, the "average particle diameter" can be measured as a volume-average particle diameter in accordance with JIS Z8825 by a laser diffraction method.

[Percentage Content]

The percentage content of the vinyl chloride resin particles in (a) the vinyl chloride resin relative to 100 mass % of (a) the vinyl chloride resin is typically 70 mass % or more, preferably more than 70 mass %, more preferably 75 mass % or more, and further preferably 80 mass % or more, and may be 100 mass %. The percentage content of the vinyl chloride resin particles may be less than 100 mass %, is preferably 99 mass % or less, more preferably 95 mass % or less, and further preferably 92 mass % or less.

As a result of the percentage content of the vinyl chloride resin particles in (a) the vinyl chloride resin being not less than the above-mentioned lower limit, more favorable tensile elongation can be achieved while sufficiently ensuring the physical strength of a vinyl chloride resin molded product formed using the vinyl chloride resin composition. As a result of the percentage content of the vinyl chloride resin particles in (a) the vinyl chloride resin being not more than the above-mentioned upper limit, the powder fluidity of the vinyl chloride resin composition can be further improved.

<<Vinyl Chloride Resin Fine Particles>>

In the vinyl chloride resin composition, the vinyl chloride resin fine particles typically function as a dusting agent (powder fluidity modifier). The vinyl chloride resin fine particles are preferably produced by emulsion polymerization.

[Average Degree of Polymerization]

The average degree of polymerization of the vinyl chloride resin fine particles is preferably 500 or more, more preferably 700 or more, and further preferably 900 or more, and preferably 5000 or less, more preferably 3000 or less, further preferably 2500 or less, and still more preferably 1500 or less. For example, in the case of using two types of vinyl chloride resin fine particles having different average degrees of polymerization as dusting agents, appropriate selection may be made, e.g. the average degree of polymerization of one type of vinyl chloride resin fine particles being 500 or more and 1000 or less and the average degree of polymerization of the other type of vinyl chloride resin fine particles being 1400 or more and 2200 or less. As a result of the average degree of polymerization of the vinyl chloride resin fine particles as a dusting agent being not less than the above-mentioned lower limit, the flexibility and heat aging resistance (tensile characteristics) of a molded product obtained using the composition can be further improved.

[Average Particle Diameter]

The average particle diameter of the vinyl chloride resin fine particles is typically less than 30 μm, preferably 10 μm or less, and preferably 0.1 μm or more. As a result of the average particle diameter of the vinyl chloride resin fine particles being not less than the above-mentioned lower limit, more favorable powder fluidity of the vinyl chloride resin composition can be achieved, for example, without excessively reducing the size as a dusting agent. As a result of the average particle diameter of the vinyl chloride resin fine particles being not more than the above-mentioned upper limit, the meltability of the vinyl chloride resin composition can be further enhanced, and the smoothness of the formed vinyl chloride resin molded product can be further improved.

[Percentage Content]

The percentage content of the vinyl chloride resin fine particles in (a) the vinyl chloride resin relative to 100 mass % of (a) the vinyl chloride resin is preferably 1 mass % or more and more preferably 5 mass % or more, and preferably 30 mass % or less and more preferably 20 mass % or less, and may be 0 mass %. As a result of the percentage content of the vinyl chloride resin fine particles in (a) the vinyl chloride resin being not less than the above-mentioned lower limit, the powder fluidity of the vinyl chloride resin composition can be further improved. As a result of the percentage content of the vinyl chloride resin fine particles in (a) the vinyl chloride resin being not more than the above-mentioned upper limit, the physical strength of the vinyl chloride resin molded product formed using the vinyl chloride resin composition can be further enhanced.

<(b) Plasticizer>

The presently disclosed vinyl chloride resin composition further contains (b) the plasticizer in a predetermined amount relative to the content of (a) the vinyl chloride resin.

<<Content>>

The content of (b) the plasticizer relative to 100 parts by mass of (a) the vinyl chloride resin is preferably 80 parts by mass or more, more preferably 85 parts by mass or more, and further preferably 90 parts by mass or more, and preferably 200 parts by mass or less, more preferably 150 parts by mass or less, and further preferably 100 parts by mass or less. If the content of (b) the plasticizer is in the above-mentioned range, favorable tensile elongation of the vinyl chloride resin molded product formed using the vinyl chloride resin composition can be ensured. In the case where the content of (b) the plasticizer is not less than the above-mentioned lower limit, a problem of stickiness of the molded product surface tends to arise. The presently disclosed vinyl chloride resin composition, however, contains the below-mentioned predetermined (c) modified silicone oil, so that the stickiness of the molded product surface can be suppressed. If the content of (b) the plasticizer is not more than the above-mentioned upper limit, the stickiness of the vinyl chloride resin molded product surface can be further suppressed.

<<Type>>

Specific examples of (b) the plasticizer include primary plasticizers and secondary plasticizers listed below.

Examples of so-called primary plasticizers include:

linear trimellitates having linear ester-forming alkyl groups, such as trimethyl trimellitate, triethyl trimellitate, tri-n-propyl trimellitate, tri-n-butyl trimellitate, tri-n-pentyl trimellitate, tri-n-hexyl trimellitate, tri-n-heptyl trimellitate, tri-n-octyl trimellitate, tri-n-nonyl trimellitate, tri-n-decyl trimellitate, tri-n-undecyl trimellitate, tri-n-dodecyl trimellitate, tri-n-tridecyl trimellitate, tri-n-tetradecyl trimellitate, tri-n-pentadecyl trimellitate, tri-n-hexadecyl trimellitate, tri-n-heptadecyl trimellitate, tri-n-stearyl trimellitate, and tri-n-alkyl trimellitate (the carbon numbers of alkyl groups included in tri-n-alkyl trimellitate may be different from each other in one molecule) [there trimellitates may each be a single compound or a mixture];

branched trimellitates having branched ester-forming alkyl groups, such as tri-i-propyl trimellitate, tri-i-butyl trimellitate, tri-i-pentyl trimellitate, tri-i-hexyl trimellitate, tri-i-heptyl trimellitate, tri-i-octyl trimellitate, tri(2-ethylhexyl) trimellitate, tri-i-nonyl trimellitate, tri-i-decyl trimellitate, tri-i-undecyl trimellitate, tri-i-dodecyl trimellitate, tri-i-tridecyl trimellitate, tri-i-tetradecyl trimellitate, tri-i-pentadecyl trimellitate, tri-i-hexadecyl trimellitate, tri-i-heptadecyl trimellitate, tri-i-octadecyl trimellitate, and trialkyl trimellitate (the carbon numbers of alkyl groups included in trialkyl trimellitate may be different from each other in one molecule) [there trimellitates may each be a single compound or a mixture];

linear pyromellitates having linear ester-forming alkyl groups, such as tetramethyl pyromellitate, tetraethyl pyromellitate, tetra-n-propyl pyromellitate, tetra-n-butyl pyromellitate, tetra-n-pentyl pyromellitate, tetra-n-hexyl pyromellitate, tetra-n-heptyl pyromellitate, tetra-n-octyl pyromellitate, tetra-n-nonyl pyromellitate, tetra-n-decyl pyromellitate, tetra-n-undecyl pyromellitate, tetra-n-dodecyl pyromellitate, tetra-n-tridecyl pyromellitate, tetra-n-tetradecyl pyromellitate, tetra-n-pentadecyl pyromellitate, tetra-n-hexadecyl pyromellitate, tetra-n-heptadecyl pyromellitate, tetra-n-stearyl pyromellitate, and tetra-n-alkyl pyromellitate (the carbon numbers of alkyl groups included in tetra-n-alkyl pyromellitate may be different from each other in one molecule) [there pyromellitates may each be a single compound or a mixture];

branched pyromellitates having branched ester-forming alkyl groups, such as tetra-i-propyl pyromellitate, tetra-i-butyl pyromellitate, tetra-i-pentyl pyromellitate, tetra-i-hexyl pyromellitate, tetra-i-heptyl pyromellitate, tetra-i-octyl pyromellitate, tetra(2-ethylhexyl) pyromellitate, tetra-i-nonyl pyromellitate, tetra-i-decyl pyromellitate, tetra-i-undecyl pyromellitate, tetra-i-dodecyl pyromellitate, tetra-i-tridecyl pyromellitate, tetra-i-tetradecyl pyromellitate, tetra-i-pentadecyl pyromellitate, tetra-i-hexadecyl pyromellitate, tetra-i-heptadecyl pyromellitate, tetra-i-octadecyl pyromellitate, and tetraalkyl pyromellitate (the carbon numbers of alkyl groups included in tetraalkyl pyromellitate may be different from each other in one molecule) [there pyromellitates may each be a single compound or a mixture];

phthalic acid derivatives such as dimethyl phthalate, diethyl phthalate, dibutyl phthalate, di(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisodecyl adipate, and diisononyl adipate;

azelaic acid derivatives such as di(2-ethylhexyl) azelate, diisooctyl azelate, and di-n-hexyl azelate;

sebacic acid derivatives such as di-n-butyl sebacate, di(2-ethylhexyl) sebacate, diisodecyl sebacate, and di(2-butyloctyl) sebacate;

maleic acid derivatives such as di-n-butyl maleate, dimethyl maleate, diethyl maleate, and di(2-ethylhexyl) maleate;

fumaric acid derivatives such as di-n-butyl fumarate and di(2-ethylhexyl) fumarate;

citric acid derivatives such as triethyl citrate, tri-n-butyl citrate, acetyl triethyl citrate, and acetyl tri(2-ethylhexyl) citrate;

itaconic acid derivatives such as monomethyl itaconate, monobutyl itaconate, dimethyl itaconate, diethyl itaconate, dibutyl itaconate, and di(2-ethylhexyl) itaconate;

oleic acid derivatives such as butyl oleate, glyceryl monooleate, and diethylene glycol monooleate;

ricinoleic acid derivatives such as methyl acetyl ricinoleate, butyl acetyl ricinoleate, glyceryl monoricinoleate, and diethylene glycol monoricinoleate;

stearic acid derivatives such as n-butyl stearate and diethylene glycol di stearate (except 12-hydroxystearic acid ester);

other fatty acid derivatives such as diethylene glycol monolaurate, diethylene glycol dipelargonate, and pentaerythritol fatty acid esters;

phosphoric acid derivatives such as triethyl phosphate, tributyl phosphate, tri(2-ethylhexyl) phosphate, tributoxyethyl phosphate, triphenyl phosphate, cresyl diphenyl phosphate, tricresyl phosphate, trixylenyl phosphate, and tris(chloroethyl) phosphate;

glycol derivatives such as diethylene glycol dibenzoate, dipropylene glycol dibenzoate, triethylene glycol dibenzoate, triethylene glycol di(2-ethylbutyrate), triethylene glycol di(2-ethylhexanoate), and dibutyl methylenebisthioglycolate;

glycerin derivatives such as glycerol monoacetate, glycerol triacetate, and glycerol tributyrate;

epoxy derivatives such as epoxy hexahydro diisodecyl phthalate, epoxy triglyceride, epoxidized octyl oleate, and epoxidized decyl oleate; and polyester plasticizers such as adipic acid polyesters, sebacic acid polyesters, and phthalic acid polyesters.

Examples of so-called secondary plasticizers include epoxidized vegetable oils such as epoxidized soybean oil and epoxidized linseed oil; chlorinated paraffin; fatty acid esters of glycol such as triethylene glycol dicaprylate; butyl epoxy stearate; phenyl oleate; and methyl dihydroabietate.

These plasticizers may be used alone or in combination of two or more thereof such as a primary plasticizer and a secondary plasticizer. In a situation in which a secondary plasticizer is used, a primary plasticizer of equivalent or greater mass is preferably used in combination with the secondary plasticizer.

Of these plasticizers, trimellitates and/or pyromellitates are preferable, trimellitates are more preferable, linear trimellitates are further preferable, and linear trimellitates having two or more alkyl groups different in carbon number in a molecule are still more preferable, in terms of obtaining favorable tensile elongation. The carbon numbers of the alkyl groups are preferably 8 to 10, and the alkyl groups are more preferably n-octyl or n-decyl. It is also preferable to use epoxidized soybean oil together with the above-mentioned trimellitate.

Although the form of (b) the plasticizer is not limited, the plasticizer is preferably liquid at normal temperature, in terms of easiness of mixture with (a) the vinyl chloride resin and also in terms of suppressing blooming on the surface of the formed vinyl chloride resin molded product (a phenomenon that ingredients precipitate on the molded product surface and turn the surface white).

<(c) Modified Silicone Oil>

The presently disclosed vinyl chloride resin composition further contains the predetermined (c) modified silicone oil, in addition to (a) the vinyl chloride resin and (b) the plasticizer.

(c) The modified silicone oil is a modified silicone oil that is at least one of: hydrogen-modified; phenyl-modified; alkyl/aralkyl-modified; and fatty acid amide-modified. The use of the vinyl chloride resin composition containing such a modified silicone oil can suppress the surface stickiness of the vinyl chloride resin molded product after molding. (c) The modified silicone oil may have other modification in a polymer having a polysiloxane structure, as long as (c) the modified silicone oil is any of hydrogen-modified, phenyl-modified, alkyl/aralkyl-modified, and fatty acid amide-modified. (c) The modified silicone oil may include two or more types of modified silicone oils.

Herein, the "modified silicone oil" refers to a silicone oil of a linear polymer composed of a siloxane bond in which a side-chain and/or end methyl group is substituted with a predetermined organic group. The "organic group" herein includes a hydrogen group. Modified silicone oils are roughly classified into reactive silicone oils and non-reactive silicone oils according to the property of the organic group introduced.

<<Type>>

(c) The silicone oil is not limited, as long as it is the above-mentioned modified silicone oil. (c) The silicone oil may be a reactive silicone oil, a non-reactive silicone oil, or a mixture thereof.

Examples of non-reactive modified silicone oils include polar group-modified silicone oils in which a polar group, such as a phenyl group, an alkyl group, an aralkyl group, or a fatty acid amide group, has been introduced into a polymer having a polysiloxane structure. Examples of reactive modified silicone oils include nonpolar group-modified silicone oils in which a hydrogen group has been introduced into a polymer having a polysiloxane structure.

Examples of such non-reactive modified silicone oils include methylphenyl silicone oil which is phenyl-modified, alkyl/aralkyl-modified silicone oil which is alkyl/aralkyl-modified, and fatty acid amide-modified silicone oil which is fatty acid amide-modified. Examples of such reactive modified silicone oils include methylhydrogen silicone oil which is hydrogen-modified. The carbon numbers of alkyl groups in these alkyl modification and fatty acid amide modification are not limited, and may be 50 or less.

The moiety at which the polar group or nonpolar group is introduced may be an end (one end or both ends) and/or side chain of the polymer having a polysiloxane structure, and the modification may be in any of the positions. To suppress the surface stickiness of the vinyl chloride resin molded product after molding more reliably, however, at least a side chain type modified silicone oil in which at least a side chain of a polymer having a polysiloxane structure is modified is preferable. In such a side chain type modified silicone oil, only a side chain of a polymer having a polysiloxane structure may be modified, or one end or both ends may be modified in addition to the side chain.

<<Content>>

To achieve the above-mentioned effects more reliably, the content of (c) the modified silicone oil relative to 100 parts by mass of (a) the vinyl chloride resin is preferably 0.05 parts by mass or more and 5 parts by mass or less, more preferably 0.1 parts by mass or more and 3 parts by mass or less, and particularly preferably 0.1 parts by mass or more and 2 parts by mass or less. The content of (c) the modified silicone oil relative to 100 parts by mass of (b) the plasticizer is preferably 0.05 parts by mass or more and 5 parts by mass or less, more preferably 0.1 parts by mass or more and 3 parts by mass or less, and particularly preferably 0.1 parts by mass or more and 2 parts by mass or less.

<Additives>

The presently disclosed vinyl chloride resin composition may further contain various additives, besides the components described above. Although no specific limitations are placed on these additives, examples of additives that may be used include: stabilizers such as perchloric acid-treated hydrotalcite, zeolites, β-diketones, and fatty acid metal salts; mold release agents; dusting agents other than the vinyl chloride resin fine particles; and other additives.

<<Perchloric Acid-Treated Hydrotalcite>>

The perchloric acid-treated hydrotalcite that may be included in the vinyl chloride resin composition can be, as perchloric acid-partially introduced hydrotalcite, easily produced by, for example, addition and stirring of hydrotalcite with a dilute aqueous solution of perchloric acid, followed by filtration, dehydration, and drying as required. Through this process, at least some of the carbonate anions ($CO_3^{2-}$) in the hydrotalcite are substituted with perchlorate anions ($ClO_4^-$) (note that 2 mol of perchlorate anions are substituted per 1 mol of carbonate anions). The molar ratio of hydrotalcite and perchloric acid may be freely set, although a ratio of 0.1 mol or more and 2 mol or less of perchloric acid relative to 1 mol of hydrotalcite is preferable.

The substitution ratio of carbonate anions in the untreated (unsubstituted with no partial introduction of perchlorate anions) hydrotalcite by perchlorate anions is preferably 50 mol % or more, more preferably 70 mol % or more, and particularly preferably 85 mol % or more. Moreover, the substitution ratio of carbonate anions in the untreated (unsubstituted with no partial introduction of perchlorate anions) hydrotalcite by perchlorate anions is preferably 95 mol % or less. As a result of the substitution ratio of carbonate anions in the untreated (unsubstituted with no partial introduction of perchlorate anions) hydrotalcite by perchlorate anions being in the range described above, a vinyl chloride resin molded product can be produced more easily.

Hydrotalcite is a non-stoichiometric compound represented by a general formula: $[Mg_{1-x}Al_x(OH)_2]^{x+}$ $[(CO_3)_{x/2}\cdot mH_2O]^{x-}$, and is an inorganic substance having a layered crystal structure formed by a positively charged basic layer of $[Mg_{1-x}Al_x(OH)_2]^{x+}$ and a negatively charged intermediate layer of $[(CO_3)_{x/2}\cdot mH_2O]^{x-}$. In the general formula shown above, x represents a number that is greater than 0 and no greater than 0.33. Natural hydrotalcite is represented by $Mg_6Al_2(OH)_{16}CO_3\cdot 4H_2O$. On the other hand, a synthetic hydrotalcite represented by $Mg_{4.5}Al_2(OH)_{13}CO_3\cdot 3.5H_2O$ is commercially available. Synthetic hydrotalcite can for example be synthesized by a method described in JP S61-174270 B2.

The amount of the perchloric acid-treated hydrotalcite is not limited. The amount of the perchloric acid-treated hydrotalcite relative to 100 parts by mass of (a) the vinyl chloride resin is preferably 0.5 parts by mass or more and more preferably 1 parts by mass or more, and preferably 7 parts by mass or less and more preferably 6 parts by mass or less. As a result of the amount of the perchloric acid-treated hydrotalcite being in the range described above, the tensile elongation of a vinyl chloride resin molded product formed through molding of the vinyl chloride resin composition can be maintained more favorably.

<<Zeolite>>

The vinyl chloride resin composition may include a zeolite as a stabilizer. A zeolite is a compound represented by a general formula: $M_{x/n} \cdot [(AlO_2)_x \cdot (SiO_2)_y] \cdot zH_2O$ (in the general formula, M is a metal ion of valency n, x+y is the number of tetrahedra per unit cell, and z is the number of moles of water). Examples of M in the general formula include monovalent and divalent metals such as Na, Li, Ca, Mg, and Zn, and mixtures thereof.

The amount of the zeolite is not limited. The amount of the zeolite relative to 100 parts by mass of (a) the vinyl chloride resin is preferably 0.1 parts by mass or more, and preferably 5 parts by mass or less.

<<β-Diketone>>

A β-diketone can be used to effectively suppress variation in initial color of a vinyl chloride resin molded product obtained through powder molding of the vinyl chloride resin composition. Specific examples of β-diketones include dibenzoylmethane, stearoylbenzoylmethane, and palmitoylbenzoylmethane. Any one of these β-diketones may be used alone or a combination of any two or more of these β-diketones may be used.

The amount of the β-diketone is not limited. The amount of the β-diketone relative to 100 parts by mass of (a) the vinyl chloride resin is preferably 0.01 parts by mass or more, and preferably 5 parts by mass or less.

<<Fatty Acid Metal Salt>>

The vinyl chloride resin composition may contain a fatty acid metal salt. The fatty acid metal salt is not limited, and may be any fatty acid metal salt. The fatty acid metal salt is preferably a metal salt of a monobasic fatty acid, more preferably a metal salt of a monobasic fatty acid having a carbon number of 12 to 24, and even more preferably a metal salt of a monobasic fatty acid having a carbon number of 15 to 21. Specific examples of the fatty acid metal salt include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. The metal in the fatty acid metal salt is preferably a metal that can produce polyvalent cations, more preferably a metal that can produce divalent cations, even more preferably a metal from periods 3 to 6 of the periodic table that can produce divalent cations, and particularly preferably a metal from period 4 of the periodic table that can produce divalent cations. The fatty acid metal salt is most preferably zinc stearate.

The amount of the fatty acid metal salt is not limited. The amount of the fatty acid metal salt relative to 100 parts by mass of (a) the vinyl chloride resin is preferably 0.01 parts by mass or more and more preferably 0.03 parts by mass or more, and preferably 5 parts by mass or less, more preferably 1 parts by mass or less, and further preferably 0.5 parts by mass or less. As a result of the amount of the fatty acid metal salt being in the range described above, the color difference value of a vinyl chloride resin molded product formed through molding of the vinyl chloride resin composition can be reduced.

<<Mold Release Agent>>

The mold release agent is not limited, and examples include 12-hydroxystearic acid-based lubricants such as a 12-hydroxystearic acid ester and a 12-hydroxystearic acid oligomer. The content of the mold release agent is not limited, and may be 0.01 parts by mass or more and 5 parts by mass or less relative to 100 parts by mass of (a) the vinyl chloride resin.

<<Other Dusting Agents>>

Examples of other dusting agents besides the vinyl chloride resin fine particles that may be included in the vinyl chloride resin composition include: inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among these examples, inorganic fine particles having an average particle diameter of 10 nm or more and 100 nm or less are preferable.

The amount of the other dusting agents is not limited. The amount of the other dusting agents relative to 100 parts by mass of (a) the vinyl chloride resin is preferably 30 parts by mass or less and more preferably 25 parts by mass or less, and may be 10 parts by mass or more. One of these other dusting agents may be used individually, or two or more of these other dusting agents may be used in combination. The other dusting agents may be used together with the aforementioned vinyl chloride resin fine particles.

<<Other Additives>>

Other additives that may be contained in the vinyl chloride resin composition are not limited. Examples include colorants (pigments), impact modifiers, perchloric acid compounds other than perchloric acid-treated hydrotalcite (for example, sodium perchlorate and potassium perchlorate), antioxidants, fungicides, flame retardants, antistatic agents, fillers, light stabilizers, and foaming agents.

Specific examples of colorants (pigments) include quinacridone pigments, perylene pigments, condensed polyazo pigments, isoindolinone pigments, copper phthalocyanine pigments, titanium white, and carbon black. Any one of these pigments or any two or more of these pigments may be used.

A quinacridone pigment is obtained through concentrated sulfuric acid treatment of a p-phenylene dianthranilic acid and has a hue from yellowish red to reddish purple. Specific examples of quinacridone pigments include quinacridone red, quinacridone magenta, and quinacridone violet.

A perylene pigment is obtained through a condensation reaction of perylene-3,4,9,10-tetracarboxylic anhydride and an aromatic primary amine and has a hue from red to red-purple/brown. Specific examples of perylene pigments include perylene red, perylene orange, perylene maroon, perylene vermilion, and perylene bordeaux.

A condensed polyazo pigment is obtained through condensation of an azo pigment in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone pigment is obtained through a condensation reaction of 4,5,6,7-tetrachloroisoindolinone and an aromatic primary diamine and has a hue from greenish yellow to red/brown. A specific example of an isoindolinone pigment is isoindolinone yellow.

A copper phthalocyanine pigment is a pigment in which copper is coordinated with a phthalocyanine and has a hue from yellowish green to bright blue. Specific examples of copper phthalocyanine pigments include phthalocyanine green and phthalocyanine blue.

Titanium white is a white pigment made from titanium dioxide. Titanium white has high opacity and exists in anatase form and rutile form.

Carbon black is a black pigment having carbon as a main component and also including oxygen, hydrogen, and nitrogen. Specific examples of carbon black include thermal black, acetylene black, channel black, furnace black, lamp black, and bone black.

Specific examples of impact modifiers include an acrylonitrile-butadiene-styrene copolymer, a methyl methacrylate-butadiene-styrene copolymer, a chlorinated polyethylene, an ethylene-vinyl acetate copolymer, and a chlorosulfonated polyethylene. One impact modifier or two or more impact modifiers may be used in the vinyl chloride resin composition. Note that the impact modifier is dispersed as a heterogeneous phase of fine elastic particles in the vinyl chloride resin composition. In the vinyl chloride resin composition, polar groups and chains graft polymerized with the elastic particles are compatible with (a) the vinyl chloride resin and improve impact resistance of the vinyl chloride resin composition.

Specific examples of antioxidants include phenolic antioxidants, sulfuric antioxidants, and phosphoric antioxidants such as phosphite.

Specific examples of fungicides include aliphatic ester-based fungicides, hydrocarbon-based fungicides, organic nitrogen-based fungicides, and organic nitrogen sulfur-based fungicides.

Specific examples of flame retardants include halogen-containing flame retardants such as chlorinated paraffin; phosphoric flame retardants such as phosphoric acid esters; and inorganic hydroxides such as magnesium hydroxide and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts and quaternary ammonium salts; and non-ionic antistatic agents such as polyoxyethylene alkyl ethers and polyoxyethylene alkyl phenol ethers.

Specific examples of fillers include silica, talc, mica, calcium carbonate, and clay.

Specific examples of light stabilizers include ultraviolet absorbers based on benzotriazoles, benzophenone, and nickel chelate, and hindered amine light stabilizers.

Specific examples of foaming agents include organic foaming agents such as azo compounds (for example, azodicarbonamides and azobisisobutyronitrile), nitroso compounds (for example, N,N'-dinitrosopentamethylenetetramine), and sulfonyl hydrazide compounds (for example p-toluenesulfonyl hydrazide and p,p-oxybis(benzenesulfonyl hydrazide)); and gaseous foaming agents such as chlorofluorocarbons, carbon dioxide gas, water, and volatile hydrocarbon compounds (for example, pentane), and microcapsules containing any of these gaseous foaming agents.

<Production Method of Vinyl Chloride Resin Composition>

The presently disclosed vinyl chloride resin composition can be produced by mixing the components described above.

No specific limitations are placed on the method used to mix (a) the vinyl chloride resin, (b) the plasticizer, (c) the modified silicone oil, and vinyl chloride resin fine particles and additives used as required. One example of the mixing method involves mixing the components with the exception of the dusting agent including the vinyl chloride resin fine particles by dry blending and subsequently adding and mixing in the dusting agent. The dry blending is preferably carried out using a Henschel mixer. The temperature during dry blending is not limited, and is preferably 50° C. or more and more preferably 70° C. or more, and preferably 200° C. or less.

<Use of Vinyl Chloride Resin Composition>

The obtained vinyl chloride resin composition can be suitably used in powder molding, and more suitably used in powder slush molding.

(Vinyl Chloride Resin Molded Product)

A presently disclosed vinyl chloride resin molded product is obtained through molding of the vinyl chloride resin composition described above by any method. Since the presently disclosed vinyl chloride resin molded product is formed using the presently disclosed vinyl chloride resin composition, surface stickiness can be suppressed. The presently disclosed vinyl chloride resin molded product is therefore suitable for use as an automobile interior material, e.g. a surface skin of an automobile instrument panel or a door trim, and particularly suitable for use as a surface skin of an automobile instrument panel.

<<Method of Molding Vinyl Chloride Resin Molded Product>>

The mold temperature during powder slush molding is not limited, and is preferably 200° C. or more and more preferably 220° C. or more, and preferably 300° C. or less and more preferably 280° C. or less.

In production of the vinyl chloride resin molded product, for example, the following method may be used without being limited thereto: The presently disclosed vinyl chloride resin composition is sprinkled onto a mold having a temperature in the aforementioned range. The vinyl chloride resin composition is initially left for 5 seconds or more and 30 seconds or less and, after shaking off any excess vinyl chloride resin composition, is then further left for 30 seconds or more and 3 minutes or less at a given temperature. The mold is subsequently cooled to 10° C. or more and 60° C. or less, and the presently disclosed vinyl chloride resin molded product obtained thereby is removed from the mold. The removed vinyl chloride resin molded product is, for example, yielded as a sheet-like molded product having the shape of the mold.

(Laminate)

A presently disclosed laminate comprises a foamed polyurethane molded product and the vinyl chloride resin molded product described above. Since the presently disclosed laminate includes the vinyl chloride resin molded product formed using the presently disclosed vinyl chloride resin composition, surface stickiness can be suppressed. The presently disclosed laminate is therefore suitable for use as an automobile interior material such as an automobile instrument panel or a door trim, and particularly suitable for use as an automobile instrument panel.

The stacking method is not limited. Examples of stacking methods that can be adopted include: (1) a method in which the foamed polyurethane molded product and the vinyl chloride resin molded product are prepared separately and are subsequently joined together by, for example, thermal fusion bonding, thermal adhesion, or using a commonly known adhesive; and (2) a method in which raw materials of the foamed polyurethane molded product such as an isocyanate and a polyol are caused to react on the vinyl chloride resin molded product so as to polymerize while carrying out polyurethane foaming by a commonly known method to directly form the foamed polyurethane molded product on the vinyl chloride resin molded product. The latter method (2) is more suitable because it involves a simple process and enables laminates of various different shapes to be obtained while facilitating firm adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the average degrees of polymerization and average particle diameters of vinyl chloride resin particles and vinyl chloride resin fine particles and the surface stickiness (coefficient of dynamic friction) of a vinyl chloride resin molded product.

<Average Degree of Polymerization>

The average degree of polymerization of each of the vinyl chloride resin particles and the vinyl chloride resin fine particles were calculated by measuring the viscosity of a solution of the vinyl chloride resin particles or vinyl chloride resin fine particles dissolved in cyclohexanone in accordance with JIS K6720-2.

<Average Particle Diameter>

The average particle diameter (volume-average particle diameter (μm)) of each of the vinyl chloride resin particles and the vinyl chloride resin fine particles was measured in accordance with JIS Z8825. Specifically, the average particle diameter of each of the vinyl chloride resin particles and the vinyl chloride resin fine particles was calculated by dispersing the vinyl chloride resin particles or vinyl chloride resin fine particles in a water tank and then using the device indicated below to measure and analyze a light diffraction-scattering intensity distribution, and thereby measure particle diameters and a volume-based particle diameter distribution.

Device: Laser diffraction particle size analyzer (SALD-2300, produced by Shimadzu Corporation)
Measurement method: Laser diffraction and scattering
Measurement range: 0.017 μm to 2500 μm
Light source: Semiconductor laser (wavelength 680 nm, output 3 mW).

<Coefficient of Dynamic Friction>

The surface stickiness of the vinyl chloride resin molded product was evaluated by measuring the coefficient of dynamic friction as follows.

Specifically, using a feeling tester (product name "TL201 Ts" produced by Trinity-Lab Inc.), a tactile contact was brought into contact with the vinyl chloride resin molded sheet under the conditions of load: 50 g, speed:10 mm/sec, test range: 70 mm, measurement range: 50 mm in a measurement environment of a temperature of 23° C. and a relative humidity of 50%, to measure the coefficient of dynamic friction of the sheet surface.

Example 1

<Production of Vinyl Chloride Resin Composition>

Ingredients shown in Table 1 with the exception of plasticizers (trimellitate and epoxidized soybean oil) and vinyl chloride resin fine particles used as a dusting agent were added into a Henschel mixer and mixed. The plasticizers were all added to the mixture after increasing the temperature of the mixture to 80° C., and the mixture was further heated to be dried up (i.e., the mixture changed to a dry state through absorption of the plasticizers by vinyl chloride resin particles used as vinyl chloride resin). Thereafter, once the dried-up mixture had been cooled to a temperature of 70° C. or lower, the vinyl chloride resin fine particles used as the dusting agent were added to the mixture to yield a vinyl chloride resin composition.

<Formation of Vinyl Chloride Resin Molded Product>

The resultant vinyl chloride resin composition was sprinkled onto a textured mold that was heated to a temperature of 250° C. and, after being left to melt for a given time of about 10 seconds to 20 seconds, excess vinyl chloride resin composition was shaken off. Next, the textured mold sprinkled with the vinyl chloride resin composition was placed in an oven set to a temperature of 200° C. and, once 60 seconds had passed from the placement, was cooled with cooling water. Once the mold had cooled to 40° C., a vinyl chloride resin molded sheet of 150 mm×200 mm×1 mm was removed from the mold as a vinyl chloride resin molded product.

The coefficient of dynamic friction of the resultant vinyl chloride resin molded sheet was measured and calculated by the above-mentioned methods. The results are shown in Table 1.

Example 2

A vinyl chloride resin composition and a vinyl chloride resin molded sheet were produced in the same way as in Example 1 with the exception that, in the preparation of the vinyl chloride resin composition, the ingredients were changed as shown in Table 1.

The measurement and calculation were performed by the same methods as in Example 1. The results are shown in Table 1.

Example 3

A vinyl chloride resin composition and a vinyl chloride resin molded sheet were produced in the same way as in Example 1 with the exception that, in the preparation of the vinyl chloride resin composition, the ingredients were changed as shown in Table 1.

The measurement and calculation were performed by the same methods as in Example 1. The results are shown in Table 1.

Example 4

A vinyl chloride resin composition and a vinyl chloride resin molded sheet were produced in the same way as in Example 1 with the exception that, in the preparation of the vinyl chloride resin composition, the ingredients were changed as shown in Table 1.

The measurement and calculation were performed by the same methods as in Example 1. The results are shown in Table 1.

Comparative Example 1

A vinyl chloride resin composition and a vinyl chloride resin molded sheet were produced in the same way as in Example 1 with the exception that, in the preparation of the vinyl chloride resin composition, the ingredients were changed as shown in Table 1, without using modified silicone oil.

The measurement and calculation were performed by the same methods as in Example 1. The results are shown in Table 1.

Comparative Example 2

A vinyl chloride resin composition and a vinyl chloride resin molded sheet were produced in the same way as in Example 1 with the exception that, in the preparation of the vinyl chloride resin composition, instead of modified silicone oil, unmodified dimethyl silicone oil was used and amide ethylenebisstearate as a stickiness preventive agent was used.

The measurement and calculation were performed by the same methods as in Example 1. The results are shown in Table 1.

Comparative Example 3

A vinyl chloride resin composition and a vinyl chloride resin molded sheet were produced in the same way as in Example 1 with the exception that, in the preparation of the vinyl chloride resin composition, instead of modified silicone oil, amide ethylenebisstearate as a stickiness preventive agent was used.

The measurement and calculation were performed by the same methods as in Example 1. The results are shown in Table 1.

TABLE 1

|  |  |  | Example 1 | Example 2 | Example 3 | Example 4 | Comparative Example 1 | Comparative Example 2 | Comparative Example 3 |
|---|---|---|---|---|---|---|---|---|---|
| Vinyl chloride resin composition | Substrate | Vinyl chloride resin particles[1] [parts by mass] | 100 | 100 | 100 | 100 | 100 | 100 | 100 |
|  | Plasticizer | Trimellitate[2] [parts by mass] | 95 | 95 | 95 | 95 | 95 | 95 | 95 |
|  |  | Epoxidized soybean oil[3] [parts by mass] | 2 | 2 | 2 | 2 | 2 | 2 | 2 |
|  | Stabilizer | Perchloric acid-partially introduced hydrotalcite[4] [parts by mass] | 2 | 2 | 2 | 2 | 2 | 2 | 2 |
|  |  | Zeolite[5] [parts by mass] | 1 | 1 | 1 | 1 | 1 | 1 | 1 |
|  |  | β-diketone[6] [parts by mass] | 0.2 | 0.2 | 0.2 | 0.2 | 0.2 | 0.2 | 0.2 |
|  |  | Zinc stearate[7] [parts by mass] | 0.1 | 0.1 | 0.1 | 0.1 | 0.1 | 0.1 | 0.1 |
|  | Antioxidant | Phosphite-based antioxidant[8] [parts by mass] | 0.3 | 0.3 | 0.3 | 0.3 | 0.3 | 0.3 | 0.3 |
|  | Light stabilizer | Hindered amine-based light stabilizer[9] [parts by mass] | 0.2 | 0.2 | 0.2 | 0.2 | 0.2 | 0.2 | 0.2 |
|  | Mold release agent | 12-hydroxystearic acid[10] [parts by mass] | 0.1 | 0.1 | 0.1 | 0.1 | 0.1 | 0.1 | 0.1 |
|  | Silicone oil | Methylhydrogen silicone oil[11] [parts by mass] | 0.6 | — | — | — | — | — | — |
|  |  | Methylphenyl silicone oil[12] [parts by mass] | — | 0.6 | — | — | — | — | — |
|  |  | Long-chain alkyl/aralkyl-modified silicone oil[13] [parts by mass] | — | — | 0.6 | — | — | — | — |
|  |  | Fatty acid amide-modified silicone oil[14] [parts by mass] | — | — | — | 0.6 | — | — | — |
|  |  | Dimethyl silicone oil[15] [parts by mass] | — | — | — | — | — | 0.6 | — |
|  | Stickiness preventive agent | Amide ethylenebisstearate[16] [parts by mass] | — | — | — | — | — | 0.1 | 3 |
|  | Dusting agent | Vinyl chloride fine particles[17] [parts by mass] | 12 | 12 | 12 | 12 | 12 | 12 | 12 |
|  | Colorant | Carbon black pigment[18] [parts by mass] | 3 | 3 | 3 | 3 | 3 | 3 | 3 |
|  |  | Content of silicone oil [parts by mass vs. 100 parts by mass of vinyl chloride resin] | 0.54 | 0.54 | 0.54 | 0.54 | 0.00 | 0.54 | 0.00 |
|  |  | Content of silicone oil [parts by mass vs. 100 parts by mass of plasticizer] | 0.62 | 0.62 | 0.62 | 0.62 | 0.00 | 0.62 | 0.00 |
| Evaluation category |  | Surface stickiness (coefficient of dynamic friction at 23° C.) [-] | 0.57 | 0.60 | 0.59 | 0.47 | 0.65 | 0.63 | 0.64 |

[1] product name "ZEST ® 1300S" (ZEST is a registered trademark in Japan, other countries, or both) produced by Shin Dai-ichi Vinyl Corporation (suspension polymerization, average degree of polymerization: 1300, average particle diameter: 115 μm)
[2] product name "TRIMEX N-08" produced by Kao Corporation
[3] product name "ADK CIZER O-130S" produced by ADEKA Corporation
[4] product name "ALCAMIZER 5" produced by Kyowa Chemical Industry Co., Ltd.
[5] product name "MIZUKALIZER DS" produced by Mizusawa Industrial Chemicals, Ltd.
[6] product name "Karenz DK-1" produced by Showa Denko K.K.
[7] product name "SAKAI SZ2000" produced by Sakai Chemical Industry Co., Ltd.
[8] product name "ADK STAB 1500" produced by ADEKA Corporation
[9] product name "TINUVIN ® 770DF" (TINUVIN is a registered trademark in Japan, other countries, or both) produced by BASF SE.
[10] product name "ADK STAB LS-12" produced by ADEKA Corporation
[11] product name "KF-99" produced by Shin-Etsu Silicone (side chain type/hydrogen-modified)
[12] product name "KF-50" 3000cs" produced by Shin-Etsu Silicone (side chain type/phenyl-modified)
[13] product name "X-22-1877" produced by Shin-Etsu Silicone (side chain type/long chain alkyl/aralkyl-modified)
[14] product name "KF-3935" produced by Shin-Etsu Silicone (side chain type/higher fatty acid amide-modified)
[15] product name "KF-96-5000cs" produced by Shin-Etsu Silicone
[16] product name "SLIPACKS ® E fine powder" (SLIPACKS is a registered trademark in Japan, other countries, or both) produced by Nippon Kasei Chemical Co., Ltd.
[17] product name "ZEST PQLTX" produced by Shin Dai-ichi Vinyl Corporation (emulsion polymerization, average degree of polymerization: 800, average particle diameter: 1.8 μm)
[18] product name "DA PX 1720(A) Black" produced by Dainichiseika Color and Chemicals Mfg. Co., Ltd.

As can be understood from Table 1, in the vinyl chloride resin molded product obtained using the vinyl chloride resin composition of each of Examples 1 to 4 prepared using (a) the vinyl chloride resin, (b) the plasticizer, and (c) the modified silicone oil which is predetermined modified silicone oil, the coefficient of dynamic friction was lower than those of Comparative Examples 1 to 3, and surface stickiness was suppressed. In particular, Example 1 using methylhydrogen silicone oil and Example 4 using fatty acid amide-modified silicone oil had a considerable surface stickiness improving effect, and Example 4 had an excellent surface stickiness improving effect.

In Comparative Examples 1 and 3 not using silicone oil, the coefficient of dynamic friction of the vinyl chloride resin molded product was high, and surface stickiness was high. As can be seen from Examples 1 to 4 and Comparative Examples 1 and 3, with use of only amide ethylenebisstearate as a stickiness preventive agent, the coefficient of dynamic friction was high, and stickiness improvement was insufficient. In Comparative Example 2 using unmodified dimethyl silicone oil, the coefficient of dynamic friction was lower than that of Comparative Example 1, but higher than those of Examples 1 to 4, and stickiness improvement was insufficient. As can be seen from Comparative Examples 2 and 3, simply adding fatty acid amide and dimethyl silicone oil was insufficient in reducing the coefficient of dynamic friction.

INDUSTRIAL APPLICABILITY

It is thus possible to provide a vinyl chloride resin composition with which the stickiness of a resultant vinyl chloride resin molded product can be suppressed.

It is also possible to provide a vinyl chloride resin molded product with surface stickiness suppressed, and a laminate including the vinyl chloride resin molded product.

The invention claimed is:

1. A vinyl chloride resin composition comprising:
(a) a vinyl chloride resin;
(b) a plasticizer; and
(c) a modified silicone oil,
wherein (c) the modified silicone oil is at least one of: alkyl/aralkyl-modified silicone oil; and a fatty acid amide-modified silicone oil,
(a) the vinyl chloride resin contains vinyl chloride resin particles and vinyl chloride resin fine particles,
the average particle diameter of the vinyl chloride resin particles is 30 μm or more, and 500 μm or less,
the average degree of polymerization of the vinyl chloride resin particles is 1,300 or more, and 5,000 or less,
the average particle diameter of the vinyl chloride resin fine particles is less than 30 μm, and 0.1 μm or more,
a content of (b) the plasticizer relative to 100 parts by mass of (a) the vinyl chloride resin is 80 parts by mass or more and 100 parts by mass or less,
a content of (c) the modified silicone oil relative to 100 parts by mass of (a) the vinyl choloride resin is 0.05 parts by mass or more and 5 parts by mass or less, and
wherein the vinyl chloride resin composition is free of a hydrogen-modified silicone oil and a phenyl-modified silicone oil.

2. The vinyl chloride resin composition according to claim 1,
wherein at least a side chain of a polymer having a polysiloxane structure is modified in (c) the modified silicone oil.

3. The vinyl chloride resin composition according to claim 1 used in powder molding.

4. The vinyl chloride resin composition according to claim 3 used in powder slush molding.

5. A vinyl chloride resin molded product obtainable through molding of the vinyl chloride resin composition according to claim 3.

6. The vinyl chloride resin molded product according to claim 5 used as a surface skin of an automobile instrument panel.

7. A laminate comprising:
a foamed polyurethane molded product; and
the vinyl chloride resin molded product according to claim 5.

* * * * *